United States Patent [19]

Steeby

[11] Patent Number: 6,007,455
[45] Date of Patent: Dec. 28, 1999

[54] SEMI-AUTOMATIC SHIFT IMPLEMENTATION WITH AUTOMATIC ENGINE CONTROL ENABLE SWITCH

[75] Inventor: Jon A. Steeby, Schoolcraft, Mich.

[73] Assignee: Eaton Corporation, Cleveland, Ohio

[21] Appl. No.: 08/806,887

[22] Filed: Feb. 25, 1997

[51] Int. Cl.[6] .................................................. B60K 41/08
[52] U.S. Cl. ........................................ 477/109; 477/111
[58] Field of Search .................................. 477/109, 110, 477/111

[56] References Cited

U.S. PATENT DOCUMENTS

| | | | |
|---|---|---|---|
| 4,593,580 | 6/1986 | Schulze | 74/858 |
| 4,850,236 | 7/1989 | Braun | 74/337 |
| 5,105,357 | 4/1992 | Steeby | 364/424.1 |
| 5,193,410 | 3/1993 | Stine et al. | 74/336 |
| 5,315,900 | 5/1994 | Teeter | 477/165 |
| 5,390,561 | 2/1995 | Stine | 74/331 |
| 5,413,012 | 5/1995 | Davis | 74/335 |
| 5,425,284 | 6/1995 | Davis | 74/335 |
| 5,435,212 | 7/1995 | Menig | 74/745 |
| 5,569,115 | 10/1996 | Desautels et al. | 477/110 |
| 5,571,059 | 11/1996 | Desautels et al. | 477/111 |
| 5,573,477 | 11/1996 | Desautels et al. | 477/109 |
| 5,582,558 | 12/1996 | Palmeri et al. | 477/109 |
| 5,661,998 | 9/1997 | Genise | 74/335 |
| 5,669,852 | 9/1997 | Desautels et al. | 477/111 |
| 5,676,017 | 10/1997 | Allen, Jr. et al. | 74/336 R |
| 5,679,093 | 10/1997 | Desautels et al. | 477/109 |

*Primary Examiner*—Dirk Wright
*Attorney, Agent, or Firm*—Howard D. Gordon

[57] ABSTRACT

A semi-automatic shift implementation system (100) for a manually shifted transmission (10) having gear ratios selectively engaged and disengaged by means of jaw clutches (48, 50) selectively positioned by a shift lever (57). The system will sense a transmission neutral condition, operation of a manually actuated switch (120), and a target gear ratio ($GR_T$) and, upon sensing a transmission neutral condition and continued actuation of said switch, will automatically cause the system engine (102) to achieve a substantially synchronous speed ($ES=IS=((OS*GRT) \pm E)$) for engaging the target ratio.

23 Claims, 9 Drawing Sheets

| GEAR RATIOS | | |
|---|---|---|
| SPEED | RATIO | % STEP |
| 10 | 0.75 | 33% |
| 9 | 1.00 | 33% |
| 8 | 1.33 | 33% |
| 7 | 1.78 | 33% |
| 6 | 2.37 | 33% |
| 5 | 3.16 | 33% |
| 4 | 4.22 | 33% |
| 3 | 5.63 | 33% |
| 2 | 7.51 | 33% |
| 1 | 10.01 | |
| R HI | 9.30 | |
| R LO | 12.38 | |

OVERALL RATIO 13:1

Fig.2 PRIOR ART

SEMI-AUTOMATIC SHIFT IMPLEMENTATION WITH AUTOMATIC ENGINE CONTROL ENABLE SWITCH

RELATED APPLICATIONS

This application is related to the following copending U.S. patent applications, all assigned to EATON CORPORATION, the assignee of this application:

U.S. Ser. No. 08/649,830, filed Apr. 30, 1996 SEMI-AUTOMATIC SHIFT IMPLEMENTATION U.S. Ser. No. 08/649,831, filed Apr. 30, 1996 SEMI-AUTOMATIC SHIFT IMPLEMENTATION WITH AUTOMATIC SPLITTER SHIFTING U.S. Ser. No. 08/649,833, filed Apr. 30, 1996 INTENT-TO-SHIFT SEMI-AUTOMATIC SHIFT IMPLEMENTATION

BACKGROUND OF THE INVENTION

1. Field of the Invention

The present invention relates to a semi-automatic shift implementation control system/method for semi-automatic shifting of a lever-shifted mechanical transmission, preferably a compound transmission of the range and/or splitter type. More particularly, in a preferred embodiment of the present invention, a splitter or combined splitter-and-range-type compound transmission is provided with controls and actuators for manually performed dynamic forward main section shifting without requiring manual throttle or master clutch manipulation by lever shifting with automatic engine control to cause torque breaks for shifting into neutral and/or to synchronize for engaging the target gear ratio.

Still more particularly, the present invention relates to a semi-automatic shift implementation control system/method including a manually actuated switch for enabling automatic control of the engine for causing torque breaks and for synchronizing for engaging a target gear ratio.

2. Description of the Prior Art

Compound mechanical transmissions of the combined splitter-and-range type are widely used for heavy-duty vehicles and very well known in the prior art, as may be seen by reference to U.S. Pat. Nos. 4,754,665; 4,944,197; 5,193,410 and 5,390,561, the disclosures of which are incorporated herein by reference.

Semi-automatic shift implementation systems for compound mechanical transmissions wherein, upon manual shifting into a highest grouping of gear ratios, automatic shifting within only that highest grouping is provided, are known in the prior art and are disclosed in U.S. Pat. Nos. 4,722,248 and 5,038,627, the disclosures of which are incorporated herein by reference. Semi-automatic shift implementation systems for mechanical transmissions wherein the vehicle operator is required to manually cause a torque interruption and/or achieve synchronous conditions are known in the prior art and are disclosed in U.S. Pat. No. 5,053,961, the disclosure of which is incorporated herein by reference.

At least partially automated systems wherein engine fuel control, such as engine dither, is utilized to cause non-torque-lock conditions for shifting into neutral or for synchronizing for engaging a target gear ratio without requiring manual master clutch or throttle pedal manipulation are known in the prior art and are disclosed in U.S. Pat. Nos. 4,593,580; 4,850,236; 5,105,357; 5,508,290; 5,509,867; 5,569,115; 5,571,059 and 5,582,558, the disclosures of which are incorporated herein by reference.

U.S. Pat. No. 5,435,212, the disclosure of which is incorporated herein by reference, discloses a semi-automatic shift implementation system which, for each lever position, has automatic splitter shifting, which allows a "(2+1)×(2)×(2)" type compound 10-speed transmission to be driven with the ease of a 5-speed automatic transmission.

The above systems, as disclosed, were not totally satisfactory for certain applications, as the operator was possibly required to manipulate the splitter control and/or the throttle and/or master clutch for lever shifts.

SUMMARY OF THE INVENTION

In accordance with the present invention, many of the features of the prior art are utilized in a novel manner to provide a semi-automatic shift implementation control system/method for a multiple-speed, preferably compound transmission system which retains the efficiencies of a mechanical transmission, preferably a compound mechanical transmission, will allow such a transmission system to be provided with relatively inexpensive sensors, actuators and controls, will allow the operator to make many of the shift decisions, and will allow the transmission to be shifted with the ease of a typical passenger automobile synchronized simple manual transmission.

The foregoing is accomplished in a preferred embodiment by providing a control system/method for a transmission, preferably a splitter-type compound mechanical transmission, having relatively simple and inexpensive controls, sensors and actuators wherein forward main section ratio shifts (i.e., lever shifts) are manually implemented without the requirement of manual splitter shift selection or master clutch manipulation and with automatic engine controls to break torque and/or synchronize for the target gear ratio, and dynamic forward splitter-only shifts for each forward main section ratio are fully automatic. Preferably, if a combined splitter-and-range-type compound transmission is to be controlled, range shifting will be automatically selected by shift lever movement, as is known in commercially available "double-H" type controls.

In preferred embodiments, a display will be utilized to inform the driver of the suggested target ratio and/or of the ratio automatically synchronized for and/or to inform the operator that sufficiently synchronous conditions exist for completion of a shift. An intent-to-shift sensor switch, such as a rocker switch or pad switch on the shift lever knob, will be utilized to sense when an operator intends to shift from a currently engaged ratio into neutral and then into the target ratio for causing preselection of the required splitter shift and causing the engine to be fueled to relieve or minimize torque-lock conditions, and, after a shift into transmission neutral, when the operator intends to have automatic engine control for synchronizing a target gear ratio.

Accordingly, it is an object of the present invention to provide a new and improved semi-automatic shift implementation system for a mechanical transmission, preferably a lever-shifted compound transmission, which is relatively simple and inexpensive and allows the transmission to be driven in a manner similar to a simple passenger car synchronized manual transmission, and further includes a switch by which the operator can signal a desire for continuing automatic engine control to implement a shift or a desire to have engine control return to a manual control mode.

This and other objects and advantages of the present invention will become apparent from a reading of the following description of the preferred embodiments taken in connection with the attached drawings.

BRIEF DESCRIPTION OF THE DRAWINGS

FIG. 2 illustrates a prior art shift pattern for the transmission of FIG. 1.

DESCRIPTION OF THE PREFERRED EMBODIMENT

Figure 1:
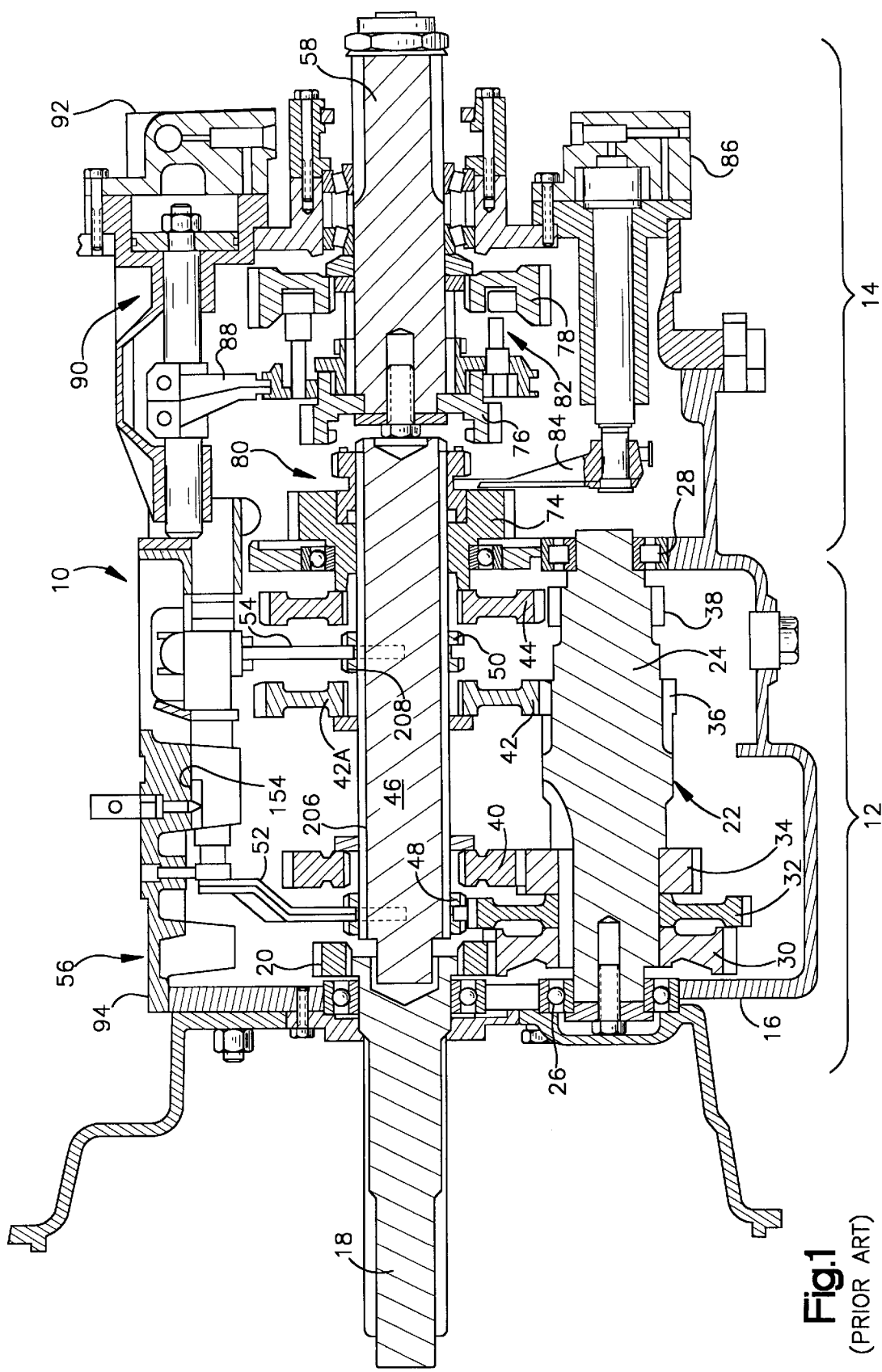
FIGS. 1 and 1A are a plan view of a combined range-and-splitter-type compound transmission.

Certain terminology will be used in the following description for convenience in reference only and will not be limiting. The words "upwardly," "downwardly," "rightwardly" and "leftwardly" will designate directions in the drawings to which reference is made. The words "forward" and "rearward" will refer, respectively, to the front and rear ends of the transmission as conventionally mounted in a vehicle, being respectively from the left and right sides of the transmission illustrated in FIG. 1. The words "inwardly" and "outwardly" will refer, respectively, to directions toward and away from the geometric center of the device and designated parts thereof. Said terminology will include the words above specifically mentioned, derivatives thereof and words of similar import.

The term "compound transmission" is used to designate a change-speed or change-gear transmission having a main transmission section and an auxiliary drive train unit, such as an auxiliary transmission section, connected in series whereby the selected gear reduction in the main transmission section may be compounded by further selected gear reduction in the auxiliary transmission section. The term "upshift" as used herein shall mean the shifting from a lower speed gear ratio to a higher speed gear ratio, and the term "downshift" as used herein shall mean the shifting from a higher speed gear ratio to a lower speed gear ratio.

Compound range-type mechanical transmissions using so-called "double-H" type controls wherein a range shift is automatically selected by movement of the shift lever, without requiring the operator to use a button or lever to select a range change, are well known in the prior art, as may be seen by reference to U.S. Pat. Nos. 3,429,202; 4,561,325; 4,455,883; 4,663,725 and 4,944,197, the disclosures of which are incorporated herein by reference.

Figure 1A:
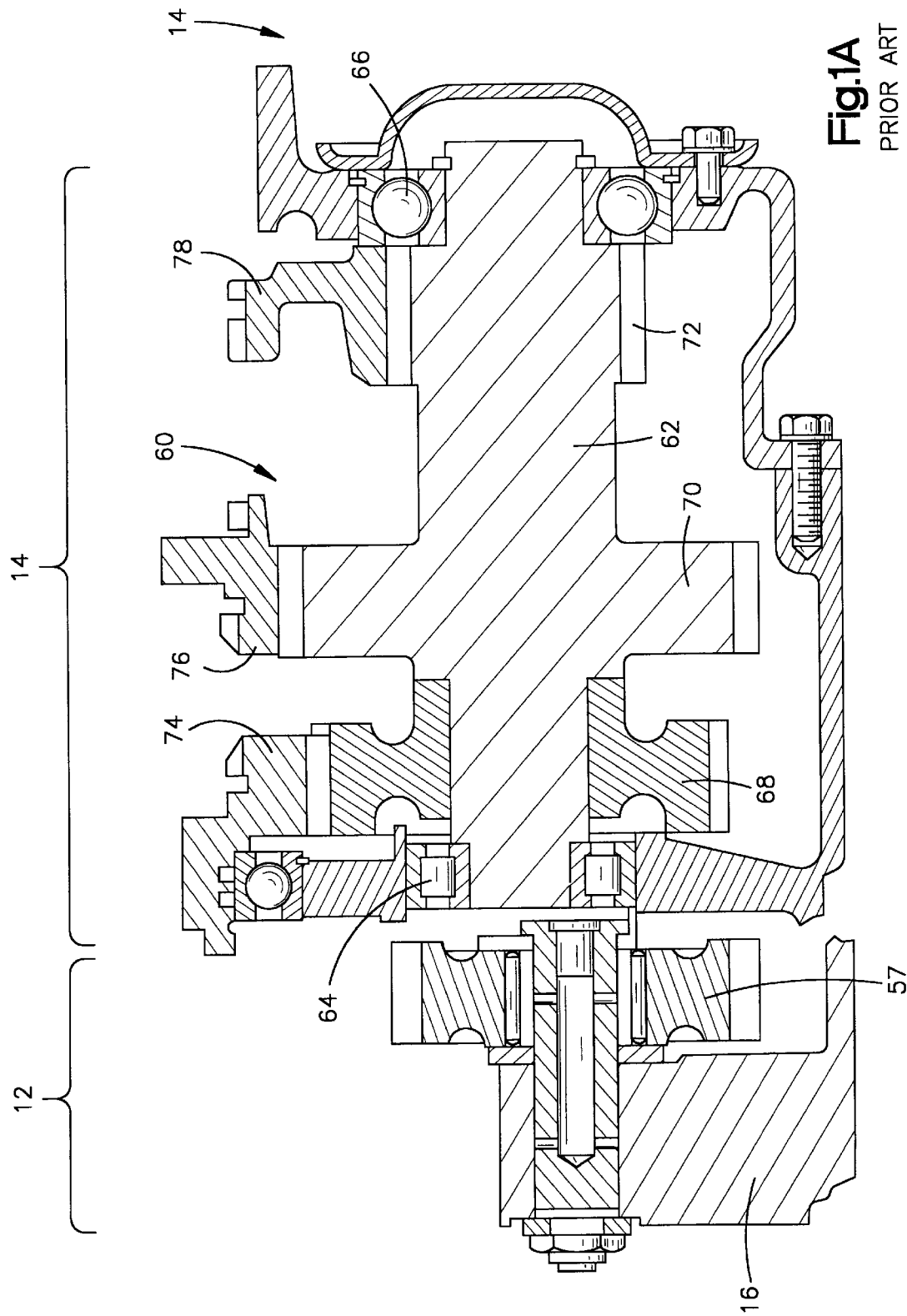

FIGS. 1 and 1A illustrate a combined range-and-splitter-type compound transmission 10 which is especially well suited for control by the semi-automatic shift implementation control system/method of the present invention. Transmission 10 comprises a main transmission section 12 connected in series with an auxiliary transmission section 14 having both range- and splitter-type gearing. Typically, transmission 10 is housed within a single multi-piece housing 16 and includes an input shaft 18 driven by a prime mover, such as a diesel engine, through a selectively disengaged, normally engaged, master friction clutch.

In the main transmission section 12, the input shaft 18 carries an input gear 20 for driving at least one countershaft assembly 22. Preferably, as is well known in the prior art and as is illustrated in U.S. Pat. Nos. 3,105,395 and 3,335,616, the disclosures of which are incorporated herein by reference, input gear 20 simultaneously drives a plurality of substantially identical main section countershaft assemblies at substantially identical rotational speeds. Each of the main section countershaft assemblies comprises a main section countershaft 24 supported by bearings 26 and 28 in housing 16 and is provided with main section countershaft gears 30, 32, 34, 36 and 38 fixed thereto. A plurality of main section drive or mainshaft gears 40, 42 and 44 surround the transmission mainshaft 46 and are selectively clutchable, one at a time, to the mainshaft 46 for rotation therewith by sliding clutch collars 48 and 50, as is well known in the art. Clutch collar 48 also may be utilized to clutch input gear 20 to the mainshaft 46 to provide a direct drive relationship between the input shaft 18 and the mainshaft 46. Preferably, each of the main section mainshaft gears encircles the mainshaft 46 and is in continuous meshing engagement with and is floatingly supported by the associated countershaft gear groups, which mounting means and special advantages resulting therefrom are explained in greater detail in aforementioned U.S. Pat. Nos. 3,105,395 and 3,335,616. Typically, clutch collars 48 and 50 are axially positioned by means of shift forks or yokes 52 and 54, respectively, associated with a shift bar housing assembly 56, which may be of the multiple-shift-rail or single-shift-shaft type, as is known in the prior art, and which is manually controlled by a shift lever 57. Clutch collars 48 and 50 are, in the preferred embodiment, of the well-known, non-synchronized, double-acting jaw clutch type.

Main section mainshaft gear 44 is the reverse gear and is in continuous meshing engagement with countershaft gears 38 by means of conventional intermediate idler gears 57 (see FIG. 1A). Main section countershaft gear 32 is provided for powering power takeoff devices and the like. Jaw clutches 48 and 50 are three-position clutches in that they may be positioned in a centered axially non-displaced, non-engaged position, as illustrated, or in a fully rightwardly engaged or fully leftwardly engaged position.

Auxiliary transmission section 14 is connected in series with main transmission section 12 and is of the three-layer, four-speed combined splitter/range type, as illustrated in aforementioned U.S. Pat. Nos. 4,754,665 and 5,390,561. Mainshaft 46 extends into the auxiliary section 14 and is journalled in the inward end of the output shaft 58, which extends from the rearward end of the transmission.

Auxiliary transmission section 14 includes in the preferred embodiment thereof a plurality of substantially identical auxiliary countershaft assemblies 60 (see FIG. 1A), each comprising an auxiliary countershaft 62 supported by bearings 64 and 66 in housing 16 and carrying three auxiliary section countershaft gears 68, 70 and 72 fixed for rotation therewith. Auxiliary countershaft gears 68 are constantly meshed with and support auxiliary section splitter gear 74. Auxiliary countershaft gears 70 are constantly meshed with and support auxiliary section splitter/range gear 76 which surrounds the output shaft 58 at the end thereof adjacent the coaxial inner end of mainshaft 46. Auxiliary section countershaft gears 72 constantly mesh with and support auxiliary section range gear 78, which surrounds the output shaft 58. Accordingly, auxiliary section countershaft gears 68 and splitter gear 74 define a first gear layer, auxiliary section countershaft gears 70 and splitter/range gear 76 define a second gear layer, and auxiliary section countershaft gears 72 and range gear 78 define a third layer, or gear group, of the combined splitter-and-range-type auxiliary transmission section 14.

A sliding double-sided jaw clutch collar 80 is utilized to selectively couple either the splitter gear 74 or the splitter/ range gear 76 to the mainshaft 46, while a two-position synchronized clutch assembly 82 is utilized to selectively couple the splitter/range gear 76 or the range gear 78 to the output shaft 58. The structure and function of double-acting jaw clutch collar 80 is substantially identical to the structure and function of the sliding clutch collars 48 and 50 utilized in the main transmission section 12, and the function of double-acting synchronized clutch assembly 82 is substantially identical to the structure and function of prior art double-acting synchronized clutch assembly, examples of which may be seen by reference to U.S. Pat. Nos. 4,462,489; 4,125,179 and 2,667,955, the disclosures of which are incorporated herein by reference. The illustrated synchronized clutch assembly 82 is of the pin type described in aforementioned U.S. Pat. No. 4,462,489.

The splitter jaw clutch 80 is a two-sided or double-acting clutch assembly which may be selectively positioned in the rightwardmost or leftwardmost positions for engaging either gear 76 or gear 74, respectively, to the mainshaft 46. In the prior art, the splitter jaw clutch 80 is axially positioned by means of a shift fork 84 controlled by a two-position piston actuator 86, which is operable by a driver selection switch (such as a button or the like) on the shift knob, as is known in the prior art. Two-position synchronized clutch assembly 82 also is a two-position clutch which may be selectively positioned in either the rightwardmost or leftwardmost positions thereof for selectively clutching either gear 78 or 76, respectively, to output shaft 58. Clutch assembly 82 is positioned by means of a shift fork 88 operated by means of a two-position piston device 90, the actuation and control of which will be described in greater detail below.

As may be seen by reference to FIGS. 1–2, by selectively axially positioning both the splitter clutch 80 and the range clutch 82 in the forward and rearward axial positions thereof, four distinct ratios of mainshaft rotation to output shaft rotation may be provided. Accordingly, auxiliary transmission section 14 is a three-layer auxiliary section of the combined range-and-splitter type providing four selectable speeds or drive ratios between the input (mainshaft 46) and output (output shaft 58) thereof. The main section 12 provides a reverse and three potentially selectable forward speeds. However, one of the selectable main section forward gear ratios, the low speed gear ratios associated with mainshaft gear 42, is not utilized in the high range. Thus, transmission 10 is properly designated as a "(2+1)×(2)×(2)" type transmission providing nine or ten selectable forward speeds, depending upon the desirability and practicality of splitting the low gear ratio. While clutch 82, the range clutch, should be a synchronized clutch, double-acting clutch collar 80, the splitter clutch, is not required to be synchronized.

According to the prior art, as disclosed in aforementioned U.S. Pat. No. 4,944,197, the main section ratios are selected and implemented manually by a shift lever, splitter shifts are manually selected by operation of a manual selector lever or button, often located on the shift lever or built into the shift knob, and are implemented by a remote two-position actuator. The range shift is manually or automatically selected and implemented by a remote two-position actuator. A separate range control button/lever may be provided, or as illustrated in FIG. 2, a lever operated "double-H" type control may be utilized. Range and splitter actuators and controls of this type are well known in the prior art, as may be seen by reference to U.S. Pat. No. 4,788,889, the disclosure of which is incorporated herein by reference.

The prior art shift pattern for shifting transmission 10 is schematically illustrated in FIG. 2. Divisions in the vertical direction at each gear lever position signify splitter shifts, while movement in the horizontal direction from the 3/4 and 5/6 leg of the "H" pattern to the 7/8 and 9/10 leg of the "H" pattern signifies a shift from the low range to the high range of the transmission. As discussed above, in the prior art, splitter shifting is accomplished in the usual manner by means of a vehicle operator- actuated splitter button or the like, usually a button located at the shift lever knob. Operation of the range clutch shifting assembly is an automatic response to movement of the gear shift lever between the central and rightwardmost legs of the shift pattern, as illustrated in FIG. 2. Range shift devices of this general type are known in the prior art, as may be seen by reference to aforementioned U.S. Pat. Nos. 3,429,202; 4,455,883; 4,561,325 and 4,663,725.

Referring again to FIG. 2, assuming it is desirable that a transmission have generally equal ratio steps, the main section ratio steps should be generally equal, the splitter step should be generally equal to the square root of the main section ratio steps, and the range step should equal about the main section ratio step raised to the $N^{TH}$ power where N equals the number of main section ratio steps occurring in both ranges (ie., N=2 in the (2+1)×(2)×(2) transmission 10). Given the desired ideal ratios, gearing to approximate these ratios is selected. In the above example, the splitter steps are about 33.3%, while the range step is about 316%, which is generally suitable for a "2+1" main transmission section having about 78% steps, as the square root of 1.78 equals about 1.33, and 1.78 raised to the second power (i.e., N=2) equals about 3.16.

To accomplish a shifting of the range section of the transmission 10 without requiring the operator to actuate any control device other than the gear lever movements to the rightwardmost leg of the shift pattern as seen in FIG. 2, a range control valve assembly is provided to provide a signal to a slave valve 92, located at piston assembly 90, to shift the shift fork 88.

Figure 3:
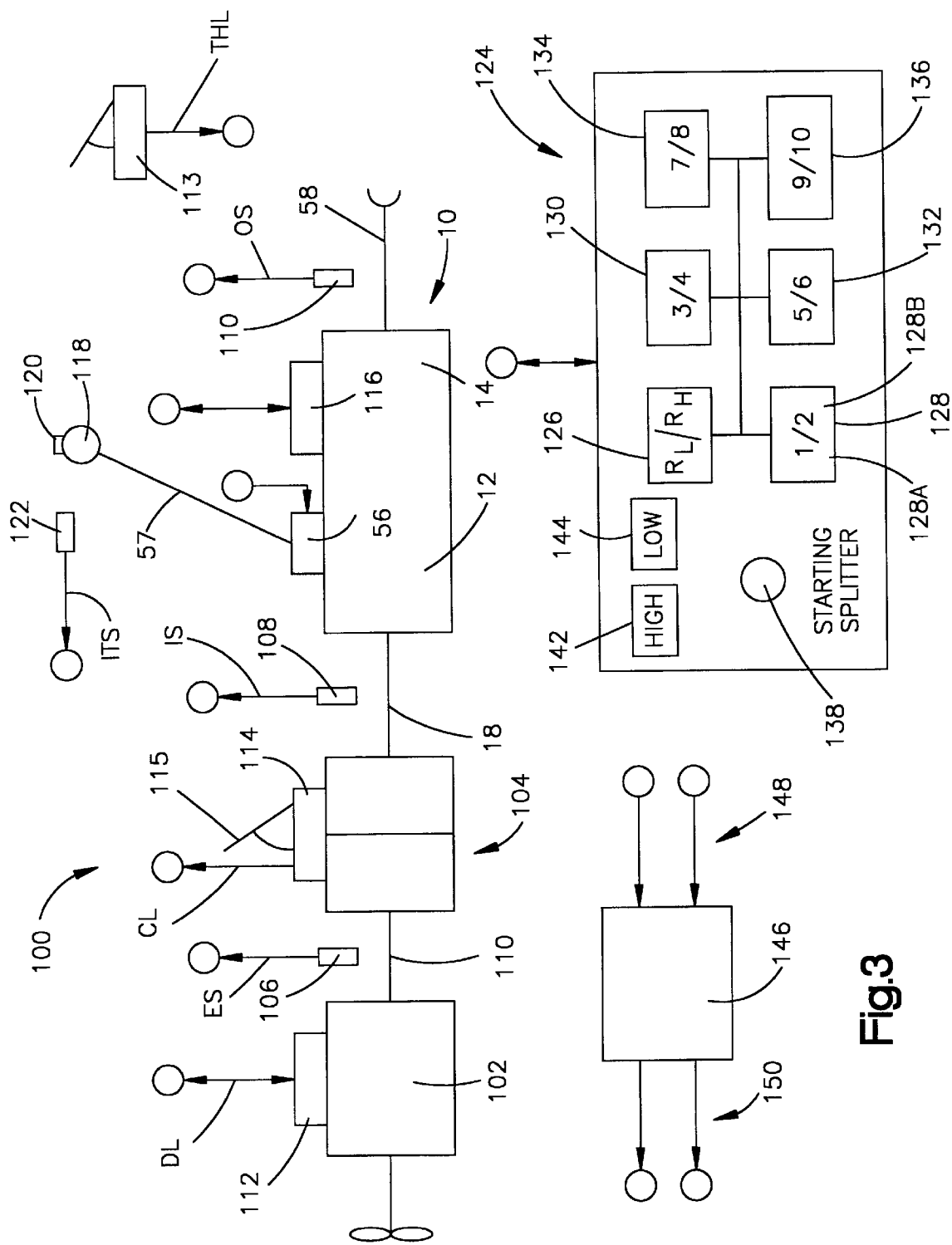
FIG. 3 is a schematic illustration, in block diagram format, of a preferred embodiment of the semi-automated shift implementation transmission system of the present invention.

According to the present invention, at least the forward shifting of transmission 10 is semi-automatically implemented by the vehicular semi-automatic transmission system 100, illustrated in FIG. 3. A compound-type transmission 10 comprising a main section 12 coupled to an auxiliary section 14 controlled by the shift control system/method of the invention, is seen in FIG. 3. Main section 12 includes input shaft 18, which is operatively coupled to the drive or crank shaft of the vehicle engine 102 by master clutch 104, and output shaft 58 of auxiliary section 14 is operatively coupled, commonly by means of a drive shaft, to the drive wheels of the vehicle (not shown).

The change-gear ratios available from main transmission section 12 are manually selectable by positioning the shift lever 57 according to the shift pattern prescribed to engage the particular change gear ratio of main section 12 desired. As will be described, manipulation of the master clutch 104 and manual control of engine fueling for synchronizing is not required. Preferably, the system will include means, such as manually controlled switches, to sense an intent to shift and will automatically take actions to minimize or relieve torque-lock conditions, allowing an easier shift into main section neutral from the engaged main section ratio and further allowing required splitter shifts to be preselected for rapid completion upon a torque break and shift into neutral and means, such as manually controlled switches, to sense an operator desire for continuing automatic control of engine fueling to cause a synchronous engine speed for engaging a target gear ratio. In the preferred embodiment, a single switch 120 may be utilized.

The system 100 includes sensors 106 for sensing engine rotational speed (ES), 108 for sensing input shaft rotational speed (IS), and 110 for sensing output shaft rotational speed (OS) and providing signals indicative thereof. Engine 102 may be electronically controlled, including an electronic controller 112 communicating over an electronic data link (DL) operating under an industry standard protocol such as SAE J-1922, SAE J-1939, ISO 11898 or the like. Throttle position (driver demand) is a desirable parameter for selecting shifting points and in other control logic. A separate throttle position sensor 113 may be provided or throttle position (THL) may be sensed from the data link. Engine speed and other parameters also may be sensed from the data link.

A manual clutch pedal 115 controls the master clutch, and a sensor 114 provides a signal (CL) indicative of clutch-engaged or -disengaged condition. The condition of the clutch also may be determined by comparing engine speed to input shaft speed. A splitter actuator 116 is provided for operating the splitter clutch 82 in accordance with command output signals. The shift lever 57 has a knob 118 which contains sensing means or a button 120 by which a driver's intent to shift and desire for continuing automatic engine control for achieving a substantially synchronous speed for engaging a target gear ratio may be sensed. Sensor 122 provides a signal (ITS) indicative of the sensed presence or absence of the driver's intent to shift into neutral and/or of the driver's continuing desire for semi-automatic shift implementation by automatic engine synchronization for engaging a target gear ratio. Various other sensors sensing movement of the shift lever may be utilized, as may be seen by reference to SAE Paper No. 840307.

A driver's control display unit 124 includes a graphic representation of the six-position shift pattern with individually lightable buttons or other display elements 126, 128, 130, 132, 134 and 136 representing each of the selectable engagement positions. The unit also includes a button 138 connected to toggle-type controls for selecting the high or low splitter range for start-from-stop splitter position selection. The selection will be indicated by lights 142 or 144.

The system includes a control unit 146, preferably a microprocessor-based control unit of the type illustrated in U.S. Pat. Nos. 4,595,986; 4,361,065 and 5,335,566, the disclosures of which are incorporated herein by reference, for receiving input signals and processing same according to predetermined logic rules to issue command output signals 150 to system actuators, such as the splitter section actuator 116, the engine controller 112 and the display unit 124. A separate system controller 146 may be provided, or the engine controller 112 communicating over an electronic data link may be utilized. The controller may include logic rules, as in disclosed in aforementioned U.S. Pat. No. 5,509,867, for calculating engine flywheel torque.

The splitter actuator 116 may be a two-position device or, as shown in copending patent application U.S. Ser. No. 08/597,304 now U.S. Pat. No. 5,661,998, a three-position device, allowing a selectable and maintainable splitter section neutral.

Forward dynamic splitter-only shifts, such as third-to-fourth and fourth-to-third shifts, are automatically implemented without driver intervention. By way of example, assuming a three-position splitter actuator, upon sensing that a splitter shift is required, the ECU 146 will issue commands to the actuator 116 to bias the actuator toward neutral, and to engine controller 112 to minimize or break torque. As soon as splitter neutral is sensed, the engine will be commanded to a synchronous engine speed for the target gear ratio at current output shaft speed ($ES=IS=OS*GR_T \pm E_{RROR}$). The engagement is timed, in view of reaction times and shaft speeds and accelerations, to occur just off synchronous to prevent clutch butting. Automatic splitter shifting of this type is illustrated in aforementioned U.S. Pat. Nos. 4,722,248 and 5,435,212.

The engaged and neutral (not engaged) conditions of transmission 10 may be sensed by comparing the input shaft/output shaft rotational speeds to known gear ratios ($IS/OS=GR_{i=1\ to\ 10} \pm Y$?) for a period of time. Position sensors may be utilized in lieu of or in addition to input shaft and output shaft speed logic.

When synchronizing to engage a target ratio, the engine is directed to achieve and remain at a speed about 30 to 100 RPM (preferably about 60 RPM) above or below (preferably below) true synchronous speed ($ES_{SYNCHRO}=(OS \times GR_T)-45$ RPM) to achieve a good quality jaw clutch engagement without butting. Alternatively, the engine speed may be caused to dither above and below true synchronous speed. To verify engagement of a target ratio, the system looks for input shaft speed equaling the product of output shaft speed and the numerical value of the target ratio, plus or minus about 10 to 30 RPM ($IS=(OS*GR_T) \pm 20$ RPM) for a period fo time, about 100 to 400 milliseconds.

The foregoing logic allows transmission engaged and neutral conditions to be determined on the basis of input and output shaft speeds without false engagement sensing caused by engine synchronizing for engagement of a target ratio.

Figure 4:
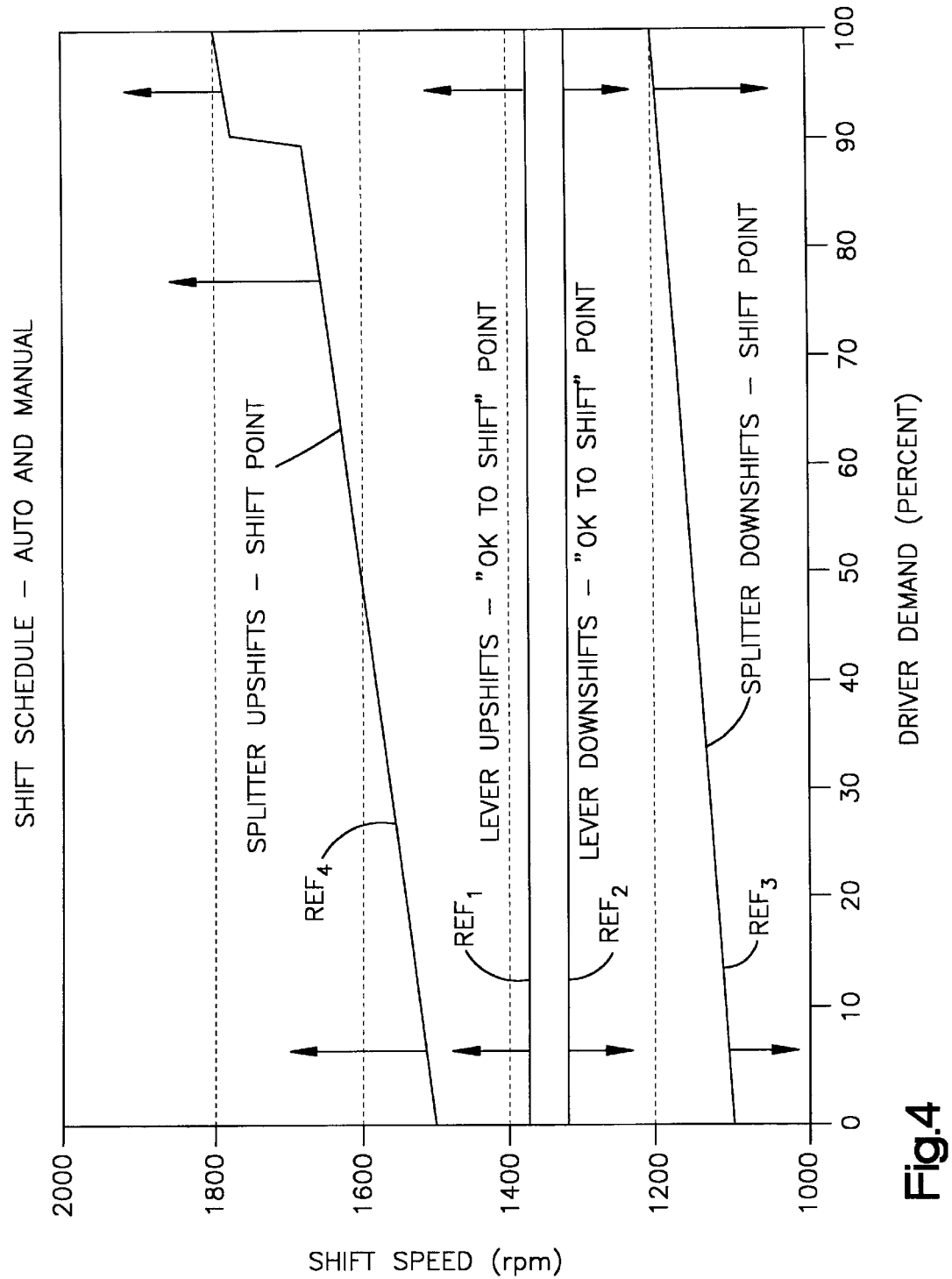
FIG. 4 is a graph illustrating the shift point logic of the control system/method of the present invention.
Figure 5A:
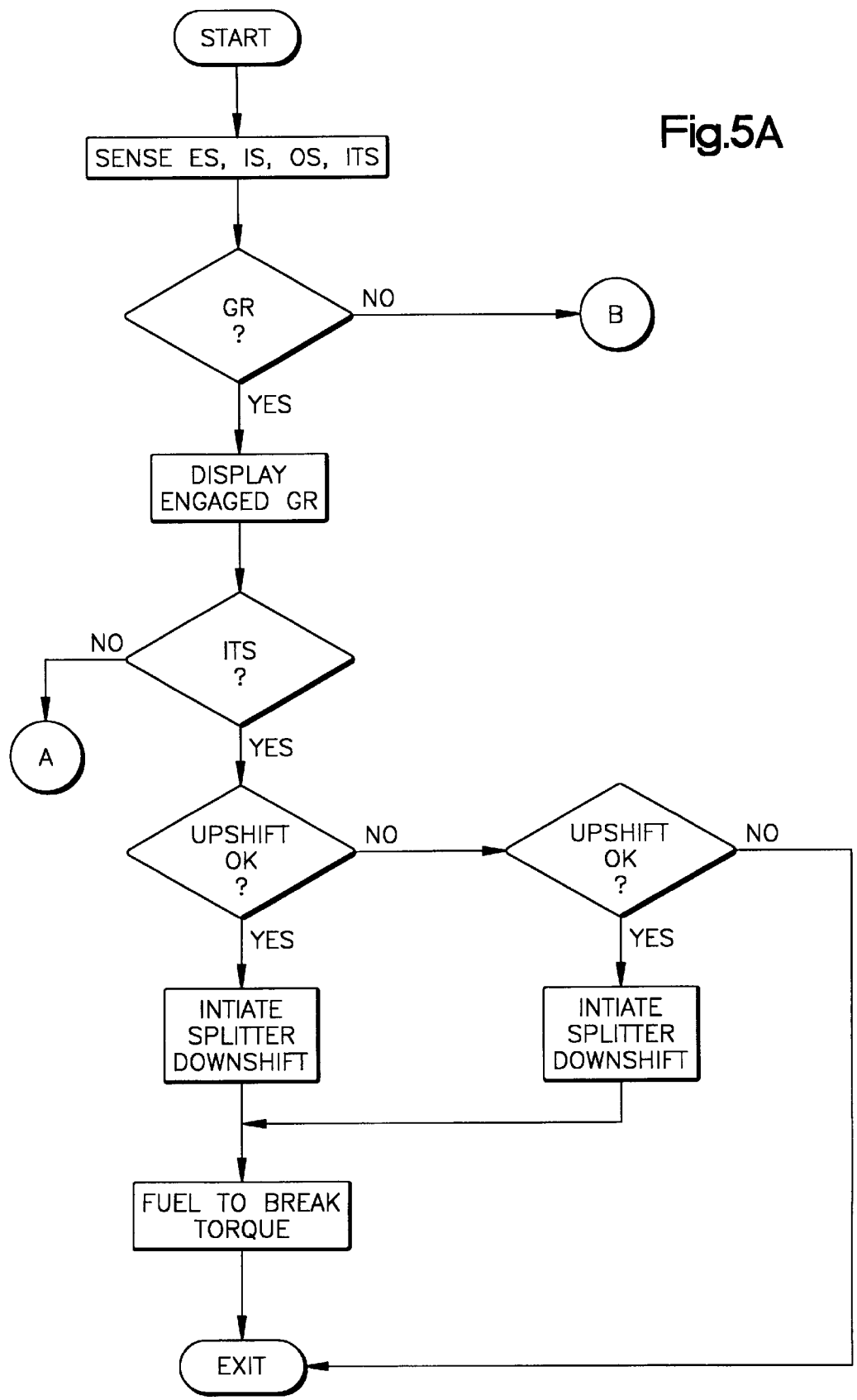
FIGS. 5A–5D are schematic illustrations, in flow chart format, of a preferred embodiment of the present invention.
Figure 5B:
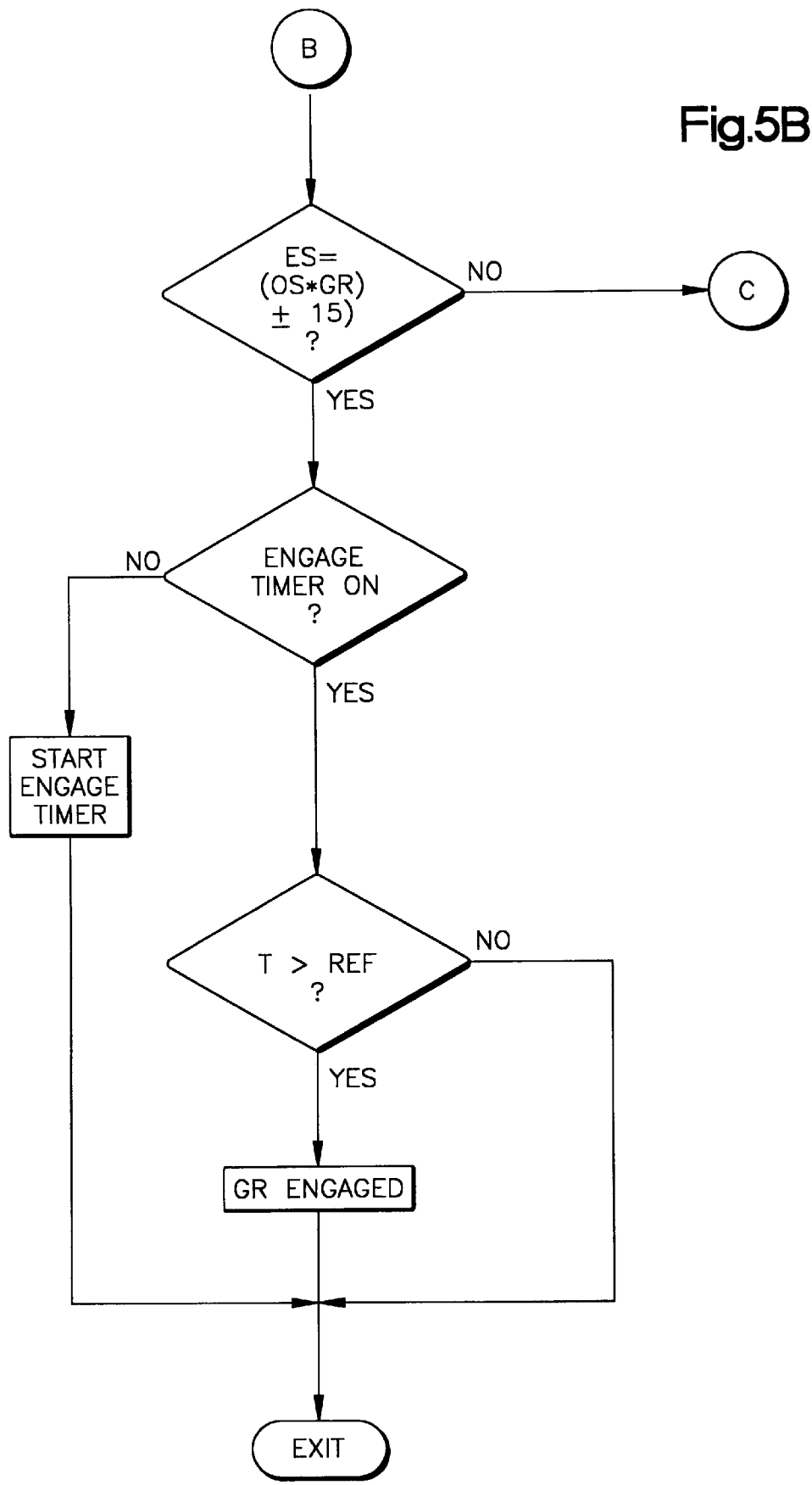
Figure 5C:
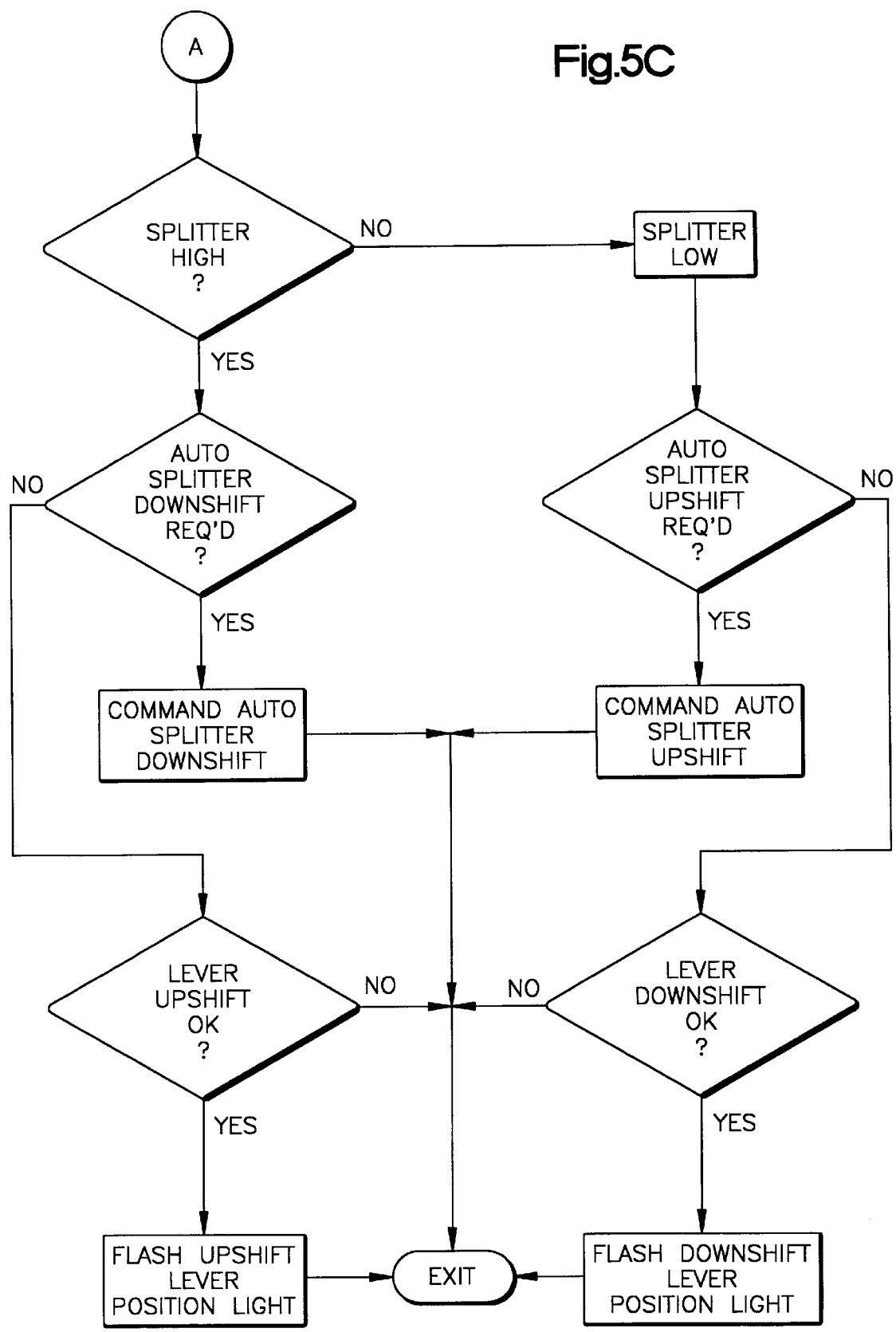
Figure 5D:
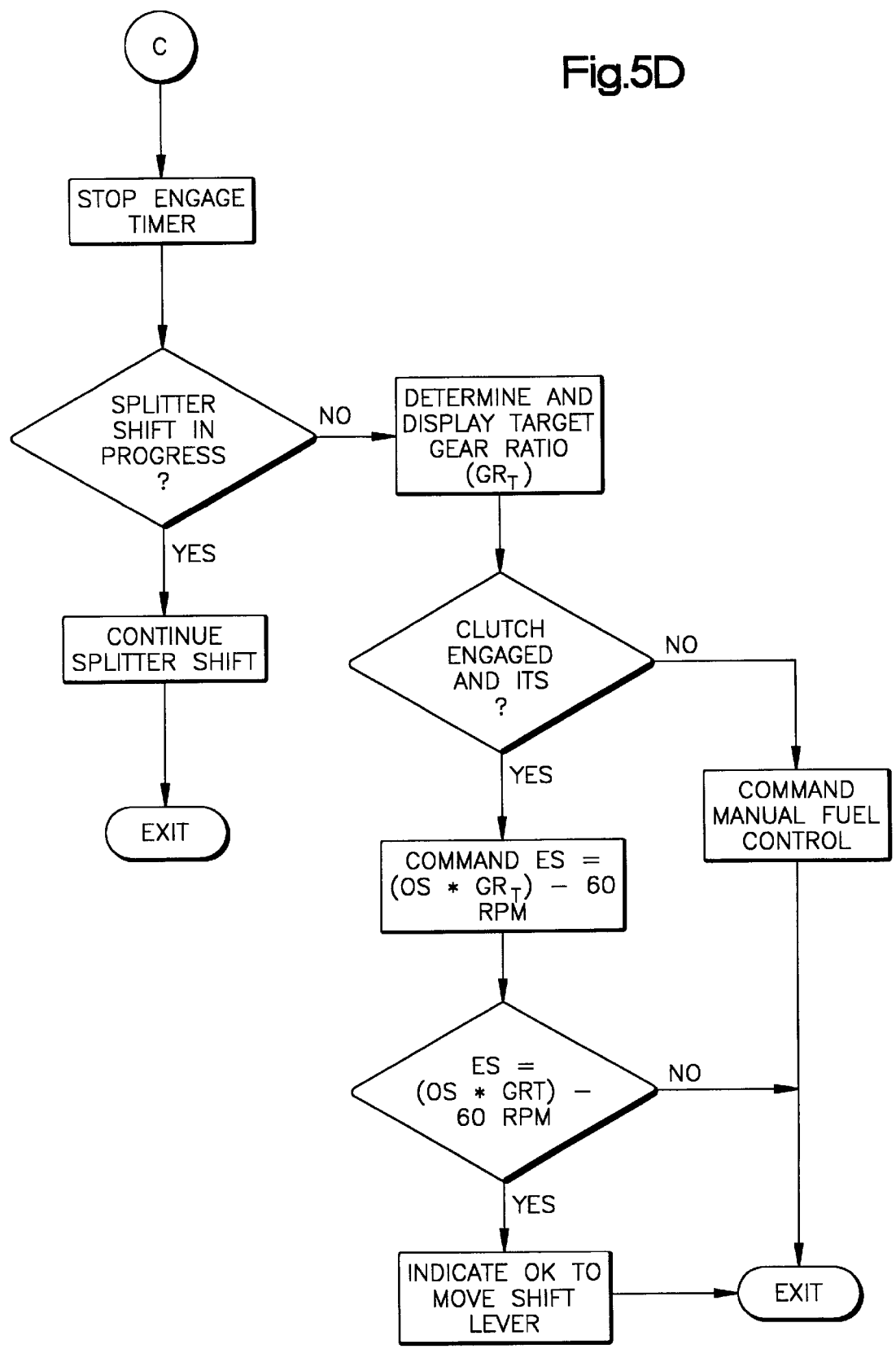

When in an even numbered ratio (i.e., when in the high splitter ratio) and above a given engine speed/input shaft speed (for example, about 1,375 RPM for a diesel engine governed to about 2,100 RPM), a lever upshift (with an automatic splitter downshift) is appropriate and the system, if requested by the driver, will semi-automatically inplement same. Similarly, when in an odd numbered ratio (i.e., when in the low splitter ratio) and below a given engine speed (for example, about 1,350 RPM for the same engine), a lever downshift (with an automatic splitter upshift) is appropriate and the system, if requested by the driver, will semi-automatically implement same. FIG. 4 illustrates the automatic splitter shift points and the appropriate lever shift points. It is noted that splitter shifts are automatically implemented, while lever shifts, with accompanying splitter shifts, require driver initiation and main section jaw clutch manipulation.

The display unit 124 will inform the driver of the currently engaged ratio lever position and the lever position of the currently appropriate lever shift, if any. In one embodiment, the lever position of the currently engaged ratio will be indicated by a steadily lighted button, while the lever position of the appropriate lever shift will be indicated by a flashing button.

Assuming fourth gear is engaged and input shaft speed is 1,525 RPM, the 3/4 button 130 will be steadily lit, indicating that third or fourth gear is engaged and, as an upshift into fifth is appropriate, the 5/6 button 132 will flash. The driver may choose to remain in fourth or decide that a shift into fifth is desirable.

Preferably, the shift knob 118 will include a sensor or an intent-to-shift button 120 by which the driver will indicate that he intends to initiate a lever shift sequence and desires continued automatic engine control to achieve synchronous or substantially synchronous conditions for engaging the target gear ratio. Upon receiving the intent-to-shift signal (ITS), the controller 146 will issue commands to the engine controller 112 to relieve torque lock by fuel manipulations and to auxiliary section actuator 116 to preselect the required splitter shift. This will allow easy shifting from the engaged ratio (fourth) into neutral without operator throttle manipulation or clutch disengagement, as well as providing a rapid splitter shift. Engine manipulations to relieve torque lock without requiring clutch disengagement is described in greater detail in aforementioned U.S. Pat. Nos. 4,850,236 and 5,105,357. Preferably, if no lever shift is then appropriate, the intent-to-shift signal will not be acted upon.

If the driver moves the lever to neutral and neutral is confirmed with the master clutch engaged and the intent-to-shift button engaged, the 3/4 button will be extinguished, while the controller 146 issues commands to the engine controller to cause the engine and input shaft speeds to approach the synchronous values therefor, when the appropriate splitter shift is completed (in this example, a splitter shift from splitter-high to splitter-low). Upon confirmation that synchronous conditions exist, the operator may shift easily into the 5/6 lever position without the use of the clutch. Upon confirmation that fifth is engaged, the 5/6 button 132 will be lit in a steady manner and engine fueling will return to manual control.

When in neutral, the operator normally will develop a rhythm of when to shift into the target ratio. Alternatively, the system may inform the operator of when the engine speed is at or is approaching synchronous sufficiently to allow the lever to be moved into the target lever position. This may be by an audible alarm, a separate "okay-to-shift" light and/or simply changing the frequency of flashing the target lever position button. Alternatively, as shown in U.S. Pat. No. 4,023,443, the disclosure of which is incorporated herein by reference, informing the operator may comprise preventing or inhibiting shifting until properly synchronous conditions exist. Also, instead of lighting an entire position button, such as the 3/4 lever position button 130, individually controlled, lighted buttons or the like may be provided for each ratio (i.e., a separately controlled display element for each of the two reverse and ten forward-speed ratios).

Upon completion of a shift and confirmation thereof, control of fueling is returned to the operator. The clutch pedal 115 is not intended to be used, except for start-from-stop operations. If the clutch is manually disengaged during a shifting operation, throttle control is immediately returned to the operator. If the intent-to-shift button 120 is released, control of fueling is returned to the operator.

Output speed (OS) is constantly monitored and, if speed changes cause a change in appropriate or "best gear" during a shift sequence, a new "best gear" will be indicated by a flashing button and will be synchronized for.

The operation of system 100 is schematically illustrated, in flow chart format, in FIGS. 5A–5D.

While many of the features of the control system/method of the present invention are applicable to many types of transmissions, the present invention is especially well suited to a splitter-type transmission or a combined splitter-and-range-type transmission with an automatic range shifting feature (see U.S. Pat. No. 5,000,060, the disclosure of which is incorporated herein by reference), as these types of transmissions utilize a minimal number of lever shifts for a given number of forward ratios.

It is also noted that in the event of a complete or partial failure of system 100, transmission 10 will have a limp-home mode of operation, allowing engagement of two, three or five wide ratio step forward speeds.

Although the present invention has been described with a certain degree of particularity, it is understood that the description of the preferred embodiment is by way of example only and that numerous changes to form and detail are possible without departing from the spirit and scope of the invention as hereinafter claimed.

I claim:

1. A manually shifted vehicular transmission system comprising:
    a transmission section having an input shaft driven by a fuel-controlled engine, an output shaft, a plurality of selectably engageable and disengageable drive ratios, and a selectable neutral, all of said drive ratios and neutral selected by means of selectively engaged and disengaged jaw clutches operatively positioned by a manually operated shift lever having a plurality of shift lever positions;
    a manually controlled switch for providing a signal indicative of operator request for automatic control of engine fueling;
    means to sense a transmission section neutral condition;
    means to determine a forward target gear ratio; and
    means to automatically control fueling of the engine, said means effective to sense a presence or absence of said signal and, (i) upon sensing transmission section neutral and the presence of said signal, to cause the engine to achieve a substantially synchronous speed for engaging said target gear ratio; and (ii) upon sensing the absence of said signal, to cause engine fueling to be in accordance with operator demand.

2. The system of claim 1 wherein said transmission section comprises a main transmission section (12) of a compound transmission.

3. The system of claim 1 further comprising means to sense engagement of said target gear ratio, said means to automatically control fueling effective to cause engine fueling to be in accordance with operator demand upon sensed engagement of said target ratio.

4. The system of claim 1 wherein said switch is a button resiliently biased to a non-activated position and located on said shift lever.

5. The system of claim 3 wherein said switch is a button resiliently biased to a non-activated position and located on said shift lever.

6. The system of claim 1 wherein said jaw clutches are non-synchronized jaw clutches.

7. The system of claim 4 further comprising means to sense said engine achieving a synchronous speed for engaging said target gear ratio and for causing the operator to be informed that the target gear ratio is engageable at substantially synchronous speeds.

8. The system of claim 1 further comprising means to sense conditions indicative of an operator intent to shift into transmission section neutral from a currently engaged ratio, said means to automatically control fueling effective to cause the engine to be fueled to minimize torque at currently engaged jaw clutches in response to sensing the presence of said signal and said conditions indicative of an operator intent to shift into transmission section neutral.

9. The system of claim 3 further comprising means to sense conditions indicative of an operator intent to shift into transmission section neutral from a currently engaged ratio, said means to automatically control fueling effective to cause the engine to be fueled to minimize torque at currently engaged jaw clutches in response to sensing the presence of said signal and said conditions indicative of an operator intent to shift into transmission section neutral.

10. The system of claim 1 further comprising a display for indicating at least one of (i) the current shift lever position and (ii) the shift lever position of the target gear ratio.

11. The system of claim 3 further comprising a display for indicating at least one of (i) the current shift lever position and (ii) the shift lever position of the target gear ratio.

12. The transmission system of claim 2 wherein said compound transmission is a splitter-type transmission and further comprising means to automatically initiate and complete all dynamic forward splitter shifts.

13. The transmission system of claim 3 wherein said compound transmission is a splitter-type transmission and further comprising means to automatically initiate and complete all dynamic forward splitter shifts.

14. The system of claim 1 further comprising sensors for providing input signals indicative of input shaft speed and output shaft speed, said means to sense a transmission section neutral condition making such determination as a function of said speed signals.

15. The system of claim 3 further comprising sensors for providing input signals indicative of engine speed, input shaft speed and output shaft speed, said means to sense a transmission section neutral condition and to sense a non-engaged condition of said friction clutch making such determinations as a function of said speed signals.

16. The system of claim 3 further comprising sensors for providing input signals indicative of input shaft and output shaft speeds, and means for sensing engagement of said drive ratios as a function of said speed signals.

17. The control system of claim 1 wherein said engine includes a microprocessor-based engine controller mounted to said engine and having a memory, said means to sense transmission neutral, determine a target gear ratio and automatically control fueling comprising logic rules stored in said memory.

18. The control system of claim 3 wherein said engine includes a microprocessor-based engine controller mounted to said engine and having a memory, said means to sense transmission neutral, determine a target gear ratio and automatically control fueling comprising logic rules stored in said memory.

19. A microprocessor-based system controller for controlling a manually shifted vehicular transmission system comprising a transmission section having an input shaft driven by a fuel-controlled engine, an output shaft, a plurality of selectably engageable and disengageable drive ratios, and a selectable neutral, all of said drive ratios and neutral selected by means of selectively engaged and disengaged jaw clutches operatively positioned by a manually operated shift lever having a plurality of shift lever positions, and a manually controlled switch for providing a signal indicative of an operator request for automatic control of engine fueling, said system controller having a memory storing logic rules effective:

to sense the presence or absence of said signal;

to sense a transmission section neutral condition;

to determine a forward target gear ratio; and to automatically control fueling of the engine, including, upon sensing (i) the presence of said signal and (ii) transmission section neutral, causing the engine to achieve a substantially synchronous speed for engaging said target gear ratio, and to automatically cause engine fueling to be in accordance with operator demand upon sensing any one of (i) engagement of said target gear ratio and (ii) an absence of said signal.

20. A manually shifted vehicular transmission system comprising:

a transmission section having an input shaft driven by a fuel-controlled engine through a manually controlled friction clutch, an output shaft, a plurality of selectably engageable and disengageable drive ratios, and a selectable neutral, all of said drive ratios and neutral selected by means of selectively engaged and disengaged jaw clutches operatively positioned by a manually operated shift lever having a plurality of shift lever positions;

a manually controlled switch for providing a signal indicative of operator request for automatic control of engine fueling;

means to sense a transmission section neutral condition;

means to sense a non-engaged condition of said friction clutch;

means to determine a forward target gear ratio; and means to automatically control fueling of the engine, said means effective to sense a presence or absence of said signal and (i) upon sensing transmission section neutral and the presence of said signal, to cause the engine to achieve a substantially synchronous speed for engaging said target gear ratio; and (ii) upon sensing a non-engaged condition of said friction clutch, to cause engine fueling to be in accordance with operator demand.

21. The system of claim 20 further comprising means to sense engagement of said target gear ratio, said means to automatically control fueling effective to cause engine fueling to be in accordance with operator demand upon sensed engagement of said target ratio.

22. A microprocessor-based system controller for controlling a manually shifted vehicular transmission system comprising a transmission section having an input shaft driven by a fuel-controlled engine through a manually controlled friction clutch, an output shaft, a plurality of selectably engageable and disengageable drive ratios, and a selectable neutral, all of said drive ratios and neutral selected by means of selectively engaged and disengaged jaw clutches operatively positioned by a manually operated shift lever having a plurality of shift lever positions, and a manually controlled switch for providing a signal indicative of an operator request for automatic control of engine fueling, said system controller having a memory storing logic rules effective:

to sense the presence or absence of said signal;

to sense a transmission section neutral condition;

to sense a non-engaged condition of said master clutch;

to determine a forward target gear ratio; and to automatically control fueling of the engine, including, upon sensing (i) the presence of said signal and (ii) transmission section neutral, causing the engine to achieve a substantially synchronous speed for engaging said target gear ratio; and effective to automatically cause engine fueling to be in accordance with operator demand upon sensed non-engagement of said friction clutch.

23. The system controller of claim 22 wherein said engine is drivingly connected to said input shaft by a manually controllable friction clutch, said logic rules further comprising logic rules for sensing a non-engaged condition of said friction clutch, and effective to automatically cause engine fueling to be in accordance with operator demand upon sensed non-engagement of said friction clutch.

* * * * *